United States Patent
Shimizu

(10) Patent No.: US 12,032,055 B2
(45) Date of Patent: Jul. 9, 2024

(54) MOVING OBJECT DETECTION APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 671 days.

(21) Appl. No.: 17/151,490

(22) Filed: Jan. 18, 2021

(65) Prior Publication Data
US 2021/0223384 A1 Jul. 22, 2021

Related U.S. Application Data

(63) Continuation of application No. PCT/JP2019/028276, filed on Jul. 18, 2019.

(30) Foreign Application Priority Data

Jul. 20, 2018 (JP) ................................ 2018-136959

(51) Int. Cl.
*G01S 13/72* (2006.01)
*G01S 13/931* (2020.01)

(52) U.S. Cl.
CPC .......... *G01S 13/723* (2013.01); *G01S 13/931* (2013.01); *G01S 2013/9315* (2020.01)

(58) Field of Classification Search
None
See application file for complete search history.

(56) References Cited

U.S. PATENT DOCUMENTS

2016/0124076 A1\* 5/2016 Nakatani ............... G01S 13/931
                                                                342/174
2018/0239015 A1\* 8/2018 Nishida ............... G01S 13/9029
(Continued)

FOREIGN PATENT DOCUMENTS

JP       H06-150196 A      5/1994
JP       2011-232818 A     11/2011

OTHER PUBLICATIONS

U.S. Appl. No. 17/151,487 and its entire file history, filed Jan. 18, 2021, Shimizu.

*Primary Examiner* — Whitney Moore
(74) *Attorney, Agent, or Firm* — MASCHOFF BRENNAN

(57) ABSTRACT

A moving object detection apparatus estimates, based on observed-point positions indicated respectively by a plurality of pieces of observed-point information, a tracking trajectory tracking movement of a moving object. The apparatus stores, based on received electric powers indicated respectively by the pieces of the observed-point information, a maximum received-electric-power. The apparatus determines, for each of the pieces of the observed-point information, whether a received-electric-power difference is greater than a drop determination value. The apparatus also determines, for each of the pieces of the observed-point information, whether the received electric power indicated by the piece of the observed-point information is not higher than a recognition determination value. When the received-electric-power difference is determined to be greater than the drop determination value and the received electric power is determined to be not higher than the recognition determination value, the apparatus suppresses the degree of tracking the observed points in the tracking trajectory.

8 Claims, 9 Drawing Sheets

(56) References Cited

U.S. PATENT DOCUMENTS

2019/0219681 A1* 7/2019 Atsushi .................. G01S 7/415
2020/0124713 A1* 4/2020 Shimizu ................ G01S 13/931

* cited by examiner

MOVING OBJECT DETECTION APPARATUS

CROSS-REFERENCE TO RELATED APPLICATIONS

The present application is a continuation application of International Application No. PCT/JP2019/028112 filed on Jul. 17, 2019, which is based on and claims priority from Japanese Patent Application No. 2018-136958 filed on Jul. 20, 2018. The contents of these applications are hereby incorporated by reference in their entirety into the present application.

BACKGROUND

1 Technical Field

The present disclosure relates to moving object detection apparatuses that detect moving objects existing around a vehicle.

2 Description of Related Art

There is disclosed, for example in Japanese Patent Application Publication No. JP 2011-017634 A, a moving object detection apparatus that detects moving objects existing around an own vehicle by emitting radar waves as transmitted waves over a predetermined angle around the vehicle and receiving reflected waves.

SUMMARY

According to the present disclosure, there is provided a moving object detection apparatus which includes an information acquisition unit, a trajectory estimation unit, a maximum electric power storage unit, an electric-power drop determination unit, a recognition determination unit and a suppression unit.

The information acquisition unit is configured to repeatedly acquire, from a radar apparatus that is mounted to a vehicle to transmit and receive radar waves, observed-point information indicating, at least, observed-point positions that are positions of observed points where the radar waves are reflected and received electric powers that are electric powers of the received radar waves.

The trajectory estimation unit is configured to estimate, based on the observed-point positions indicated by a plurality of pieces of the observed-point information acquired by the information acquisition unit respectively at different time instants, a tracking trajectory tracking movement of a moving object corresponding to a plurality of the observed points.

The maximum electric power storage unit is configured to store, based on the received electric powers indicated by the plurality of pieces of the observed-point information acquired by the information acquisition unit respectively at different time instants, a maximum received-electric-power that is a maximum value of the received electric powers.

The electric-power drop determination unit is configured to determine, for each of the plurality of pieces of the observed-point information acquired by the information acquisition unit, whether a received-electric-power difference, which is a difference value obtained by subtracting the received electric power indicated by the piece of the observed-point information from the maximum received-electric-power stored in the maximum electric power storage unit, is greater than a preset drop determination value.

The recognition determination unit is configured to determine, for each of the plurality of pieces of the observed-point information acquired by the information acquisition unit, whether the received electric power indicated by the piece of the observed-point information is lower than or equal to a preset recognition determination value.

The suppression unit is configured to suppress, when the received-electric-power difference is determined by the electric-power drop determination unit to be greater than the drop determination value and the received electric power is determined by the recognition determination unit to be lower than or equal to the recognition determination value, the degree of tracking the observed points in the tracking trajectory estimated by the trajectory estimation unit.

DESCRIPTION OF EMBODIMENTS

In a radar apparatus, when a radar wave reflected by a detection target is received by the radar apparatus, the received electric power may be lowered under the influence of multipath propagation via a road surface, roadside objects and the like, thereby lowering the S/N ratio. The inventor of the present application has found, through detailed investigation, that when the S/N ratio is lowered, the results of detecting the azimuth of the detection target may vary, causing the accuracy of detecting the position of the detection target to be lowered.

In contrast, the above-described moving object detection apparatus according to the present disclosure determines, when the received-electric-power difference is determined to be greater than the drop determination value and the received electric power is determined to be lower than or equal to the recognition determination value, that the S/N ratio is lowered. Moreover, when the S/N ratio is determined to be lowered, the moving object detection apparatus suppresses the degree of tracking the observed points in the tracking trajectory estimated by the trajectory estimation unit. The accuracy of detecting the positions of the observed points when the S/N ratio is lowered is low; therefore, it is possible for the moving object detection apparatus to estimate the tracking trajectory of the moving object suppressing the influence of the observed points where the position detection accuracy is low. Consequently, the accuracy of detecting the position of the moving object can be improved.

An embodiment of the present disclosure will be described hereinafter with reference to the drawings.

Figure 1:
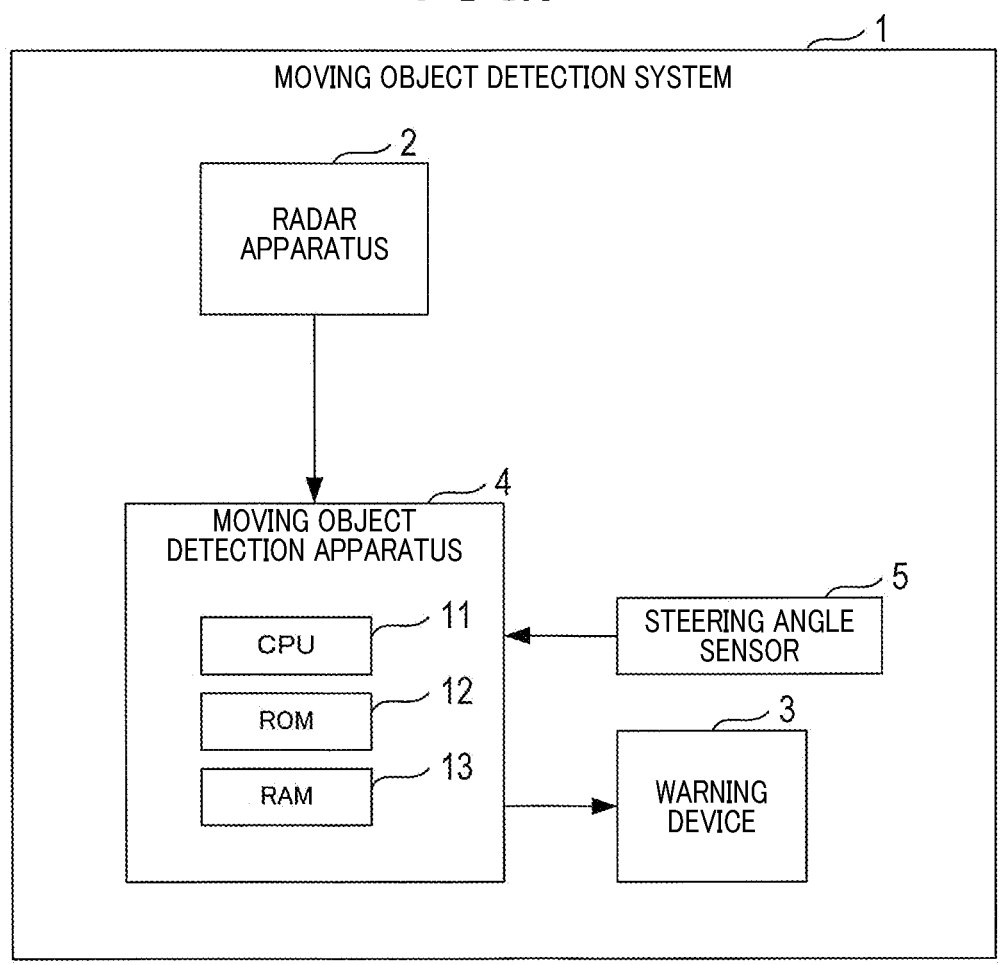
FIG. 1 is a block diagram illustrating the configuration of a moving object detection system.

A moving object detection system 1 according to the present embodiment is mounted to a vehicle. As shown in FIG. 1, the moving object detection system 1 includes a radar apparatus 2, a warning device 3, a moving object detection apparatus 4 and a steering angle sensor 5.

Figure 2:
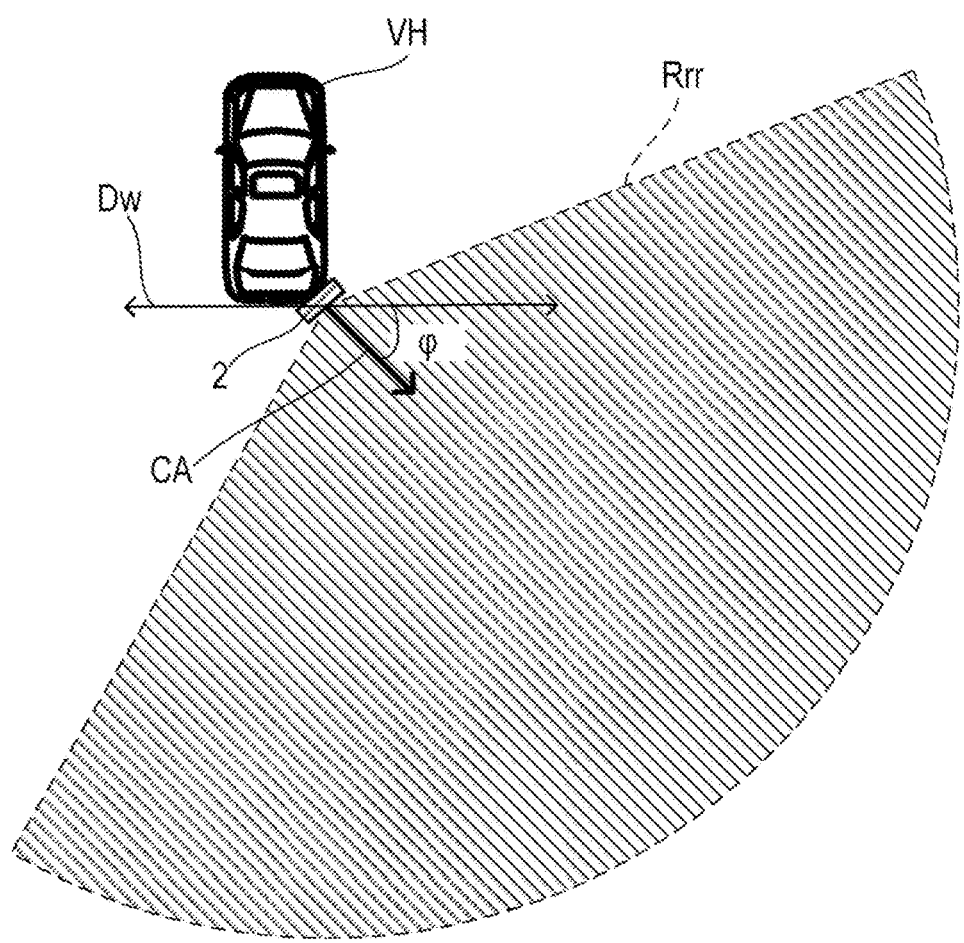
FIG. 2 is a diagram illustrating the installation position of a radar apparatus and an object detection region.

As shown in FIG. 2, the radar apparatus 2 is installed in a right-rear part of the vehicle VH to which the moving object detection system 1 is mounted. The radar apparatus 2 detects moving objects (e.g., automobiles and motorcycles) existing in an object detection region Rrr by transmitting radar waves to a right side behind the vehicle VH.

The radar apparatus 2 is installed such that a central axis CA of a detection range of a receiving antenna is oriented in a direction inclined by an installation angle φ backward with respect to a width direction DW of the vehicle VH. The detection range is set to include, for example, a range of ±80° with the central axis CA being its center.

The radar apparatus 2 uses a well-known FMCW method. The radar apparatus 2 transmits radar waves of upward modulation intervals and radar waves of downward modulation intervals alternately at a preset modulation period, and receives the reflected radar waves. In addition, FMCW is an abbreviation of Frequency Modulated Continuous Wave. The radar apparatus 2 detects, for each modulation cycle, the distances to points where the radar waves are reflected (hereinafter, to be referred to as observed points), the relative speeds between it and the observed points, the azimuths of the observed points and the electric powers of the received radar waves. In addition, the azimuths are horizontal angles with respect to the central axis CA.

Moreover, the radar apparatus 2 outputs observed-point information, which indicates the detected distances, relative speeds and azimuths of the observed points and the received electric powers, to the moving object detection apparatus 4.

The warning device 3 is an audio output device installed in the vehicle compartment. The warning device 3 is configured to output a warning sound to occupants of the vehicle.

As shown in FIG. 1, the moving object detection apparatus 4 is an electronic control apparatus which is configured mainly with a microcomputer of a well-known type; the microcomputer includes a CPU 11, a ROM 12 and a RAM 13. Various functions of the microcomputer are realized by execution of programs by the CPU 11; the programs are stored in a non-transitory tangible storage medium. In this example, the ROM 12 is the non-transitory tangible storage medium in which the programs are stored. Moreover, methods corresponding to the programs are also realized by execution of the programs. In addition, some or all of the functions performed by the CPU 11 may alternatively be realized by hardware such as one or more ICs. Furthermore, the moving object detection apparatus 4 may be configured with either a single microcomputer or a plurality of microcomputers.

The steering angle sensor 5 detects the rotation angle of a steering wheel of the vehicle VH and outputs a steering angle signal, which is indicative of the detection results, to the moving object detection apparatus 4.

Next, steps of a rear-approach warning process performed by the CPU 11 of the moving object detection apparatus 4 will be described. During operation of the moving object detection apparatus 4, the rear-approach warning process is repeated each time one modulation period elapses.

Figure 3:
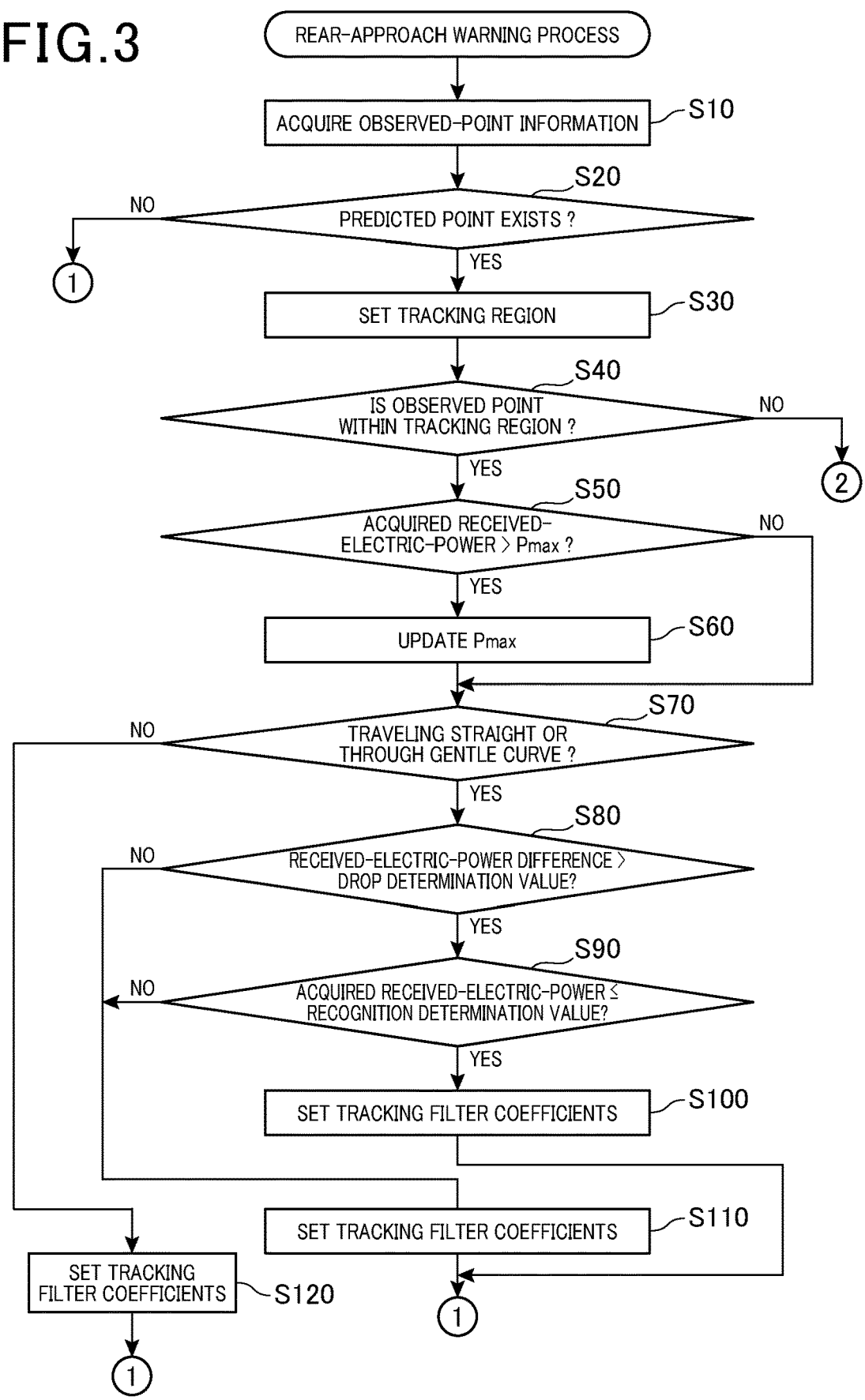
FIG. 3 is a flow chart illustrating a first half section of a rear-approach warning process.

As shown in FIG. 3, upon start of the rear-approach warning process, first in step S10, the CPU 11 acquires the observed-point information from the radar apparatus 2. Then, in step S20, the CPU 11 determines whether there exists a predicted point calculated in a previous cycle of the rear-approach warning process. In addition, predicted points are calculated in step S190 to be described later.

Figure 5:
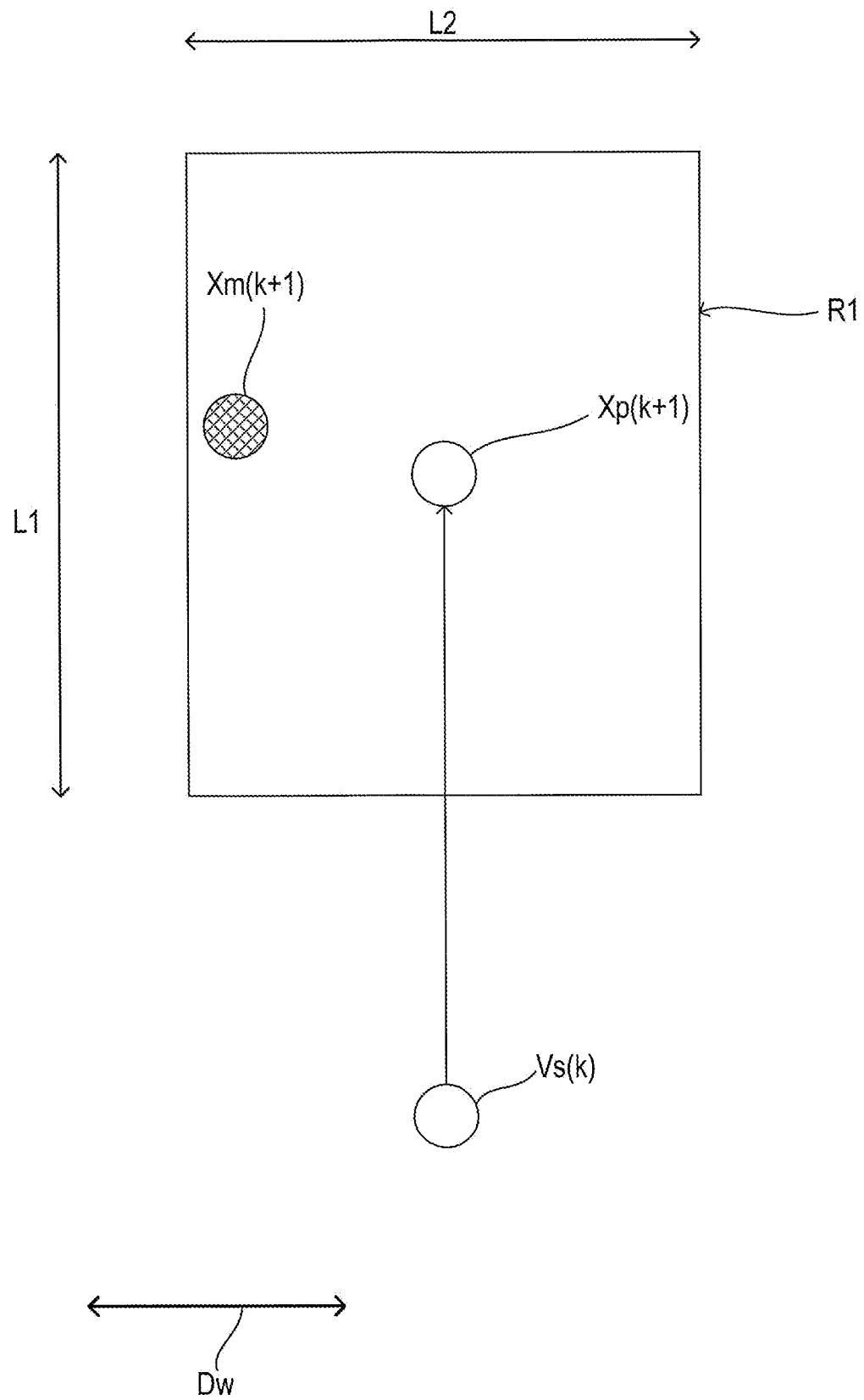
FIG. 5 is a diagram illustrating a tracking region.

If there is no predicted point, the CPU 11 advances the rear-approach warning process to step S180. On the other hand, if there is a predicted point, then in step S30, the CPU 11 sets a tracking region. Specifically, as shown in FIG. 5, the CPU 11 sets a rectangular region as a tracking region R1; the rectangular region has its center at a predicted-point position Xp(k+1) calculated in later-described step S190 in the rear-approach warning process performed before one modulation period, a preset longitudinal length L1 in a front-rear direction of the vehicle VH, and a preset lateral length L2 in the width direction DW of the vehicle VH. In the present embodiment, the longitudinal length L1 is preset to, for example, 6 m and the lateral length L2 is preset to, for example, 4 m.

Upon completion of step S30, in step S40 as shown in FIG. 3, the CPU 11 determines whether the position of an observed point (hereinafter, to be referred to as the current observed-point position), which is identified by the distance and azimuth indicated by the observed-point information acquired in step S10, is within the tracking region set in step S30. If the current observed-point position is within the tracking region, then in step S50, the CPU 11 further determines whether the received electric power indicated by the observed-point information acquired in step S10 (hereinafter, to be referred to as the acquired received-electric-power) is higher than a maximum received-electric-power Pmax stored in the RAM 13. If the acquired received-electric-power is lower than or equal to the maximum received-electric-power Pmax, the CPU 11 advances the rear-approach warning process to step S70. On the other hand, if the acquired received-electric-power is higher than the maximum received-electric-power Pmax, then in step S60, the CPU 11 updates the maximum received-electric-power Pmax by rewriting the maximum received-electric-power Pmax to the value of the acquired received-electric-power. Thereafter, the CPU 11 advances the rear-approach warning process to step S70.

Figure 6:
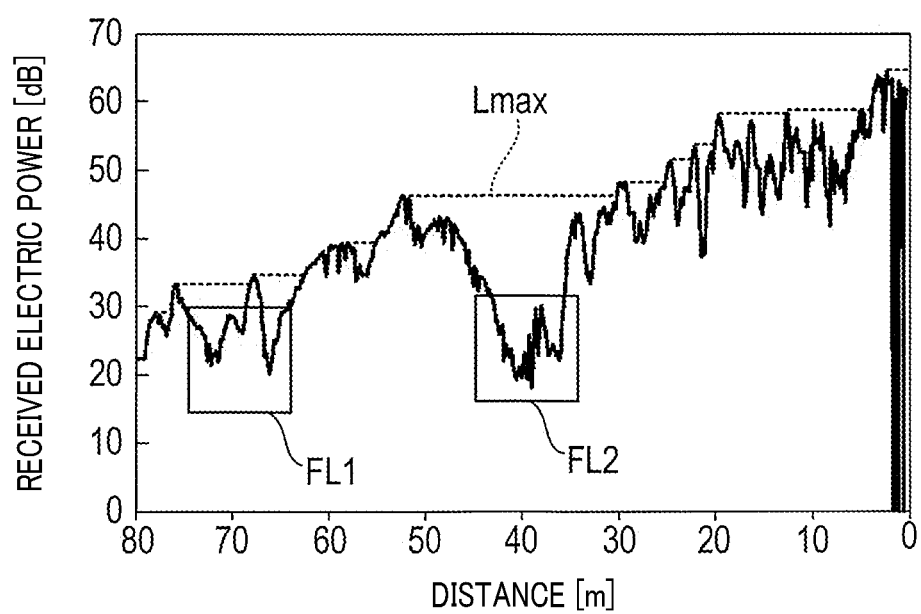
FIG. 6 is a diagram illustrating locations where the S/N ratio is lowered by multipath propagation.

FIG. 6 is a graph illustrating an example of the relationship between the distance from the radar apparatus 2 to a moving object and the received electric power. The line Lmax depicted as a dashed line in FIG. 6 represents a peak hold value of the received electric power, i.e., a maximum received-electric-power Pmax. Moreover, those areas which are enclosed by rectangular frames FL1 and FL2 represent locations where the S/N ratio is lowered by multipath propagation.

Referring back to FIG. 3, in step S70, the CPU 11 determines, based on the steering angle signal from the steering angle sensor 5, whether or not the vehicle VH is traveling straight or through a gentle curve. Specifically, the CPU 11 first calculates, based on the steering angle indicated by the steering angle signal, the radius of curvature R of a road on which the vehicle VH is traveling. If the absolute value of the calculated radius of curvature R is less than or equal to a preset traveling-straight determination value (e.g., 500 m in the present embodiment), the CPU 11 determines that the vehicle VH is traveling straight or through a gentle curve. Moreover, if the vehicle VH is determined to be traveling straight or through a gentle curve, the CPU 11 further determines, in step S80, whether a difference value (hereinafter, to be referred to as the received-electric-power difference) obtained by subtracting the acquired received-electric-power from the maximum received-electric-power Pmax is greater than a preset drop determination value. In addition, the drop determination value is preset by referring to a drop determination value map. The drop determination value map is set to have a negative correlation between the distance indicated by the observed-point information acquired in step S10 and the drop determination value. It should be noted that the expression of "having a negative correlation between the distance and the drop determination value" encompasses both the case of the drop determination value decreasing in steps with increase in the distance and the case of the drop determination value decreasing continuously with increase in the distance.

If the received-electric-power difference is determined to be greater than the drop determination value, the CPU 11 further determines, in step S90, whether the acquired received-electric-power is lower than or equal to a preset recognition determination value. In addition, the recognition determination value is preset by referring to a recognition determination value map. The recognition determination value map is set to have a negative correlation between the distance indicated by the observed-point information acquired in step S10 and the recognition determination value. It should be noted that the expression of "having a negative correlation between the distance and the recognition determination value" encompasses both the case of the recognition determination value decreasing in steps with increase in the distance and the case of the recognition determination value decreasing continuously with increase in the distance.

If the acquired received-electric-power is determined to be lower than or equal to the recognition determination value, the CPU 11 sets, in step S100, tracking filter coefficients $\alpha$ and $\beta$ to be described later. Specifically, the CPU 11 sets the tracking filter coefficient $\alpha$ by referring to a first map for use when the received-electric-power drops. Moreover, the CPU 11 sets the tracking filter coefficient $\beta$ by referring to a second map for use when the received-electric-power drops. Thereafter, the CPU 11 advances the rear-approach warning process to step S180.

The first and second maps for use when the received-electric-power drops are set to have a positive correlation between the distance indicated by the observed-point information acquired in step S10 and the tracking filter coefficients $\alpha$ and $\beta$. It should be noted that the expression of "having a positive correlation between the distance and the tracking filter coefficients" encompasses both the case of the tracking filter coefficients increasing in steps with increase in the distance and the case of the tracking filter coefficients increasing continuously with increase in the distance.

On the other hand, if the acquired received-electric-power is determined in step S90 to be higher than the recognition determination value, the CPU 11 advances the rear-approach warning process to step S110. Moreover, if the received-electric-power difference is determined in step S80 to be less than or equal to the drop determination value, the CPU 11 also advances the rear-approach warning process to step S110.

In step S110, the CPU 11 sets the tracking filter coefficients $\alpha$ and R to be described later. Specifically, the CPU 11 sets the tracking filter coefficient $\alpha$ by referring to a first map for use when the received-electric-power is normal. Moreover, the CPU 11 sets the tracking filter coefficient $\beta$ by referring to a second map for use when the received-electric-power is normal. Thereafter, the CPU 11 advances the rear-approach warning process to step S180.

The first and second maps for use when the received-electric-power is normal are set to have a positive correlation between the distance indicated by the observed-point information acquired in step S10 and the tracking filter coefficients $\alpha$ and $\beta$. Moreover, when compared at the same distance, the tracking filter coefficient $\alpha$ set by the first map for use when the received-electric-power is normal is greater than the tracking filter coefficient $\alpha$ set by the first map for use when the received-electric-power drops. Similarly, when compared at the same distance, the tracking filter coefficient $\beta$ set by the second map for use when the received-electric-power is normal is greater than the tracking filter coefficient $\beta$ set by the second map for use when the received-electric-power drops.

Figure 7:
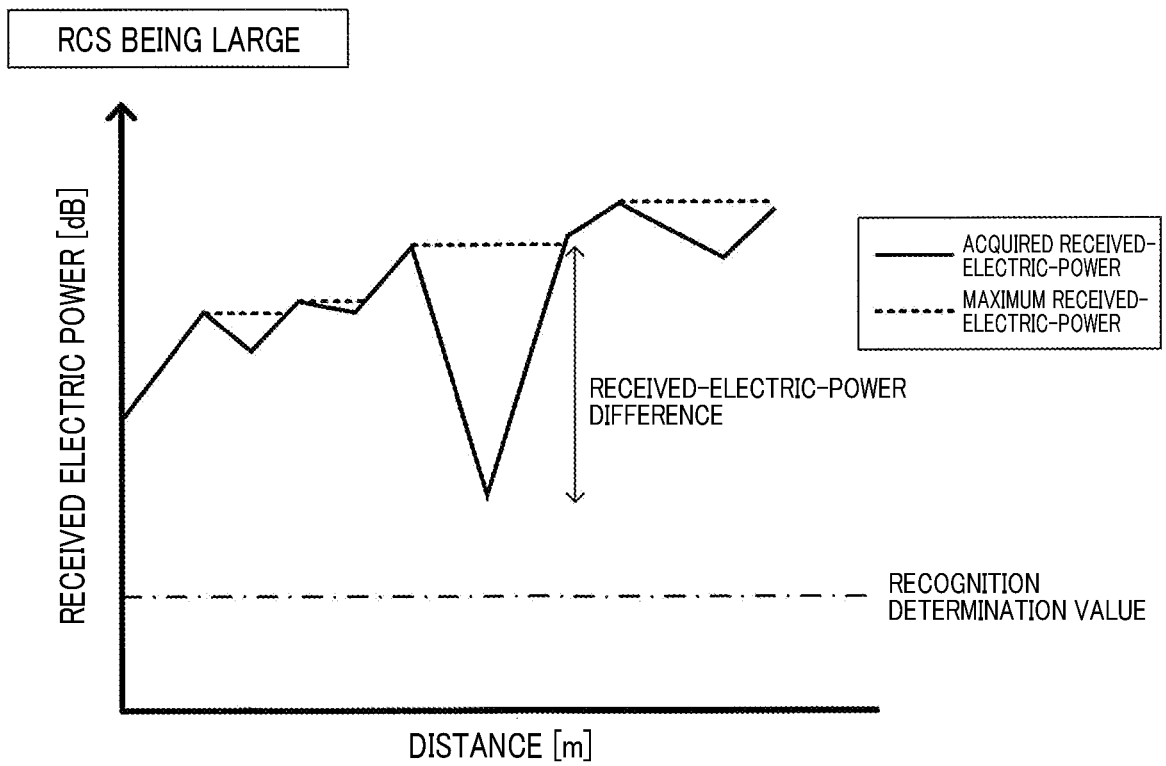
FIG. 7 is a diagram illustrating a received-electric-power difference and a recognition determination value.
Figure 7:
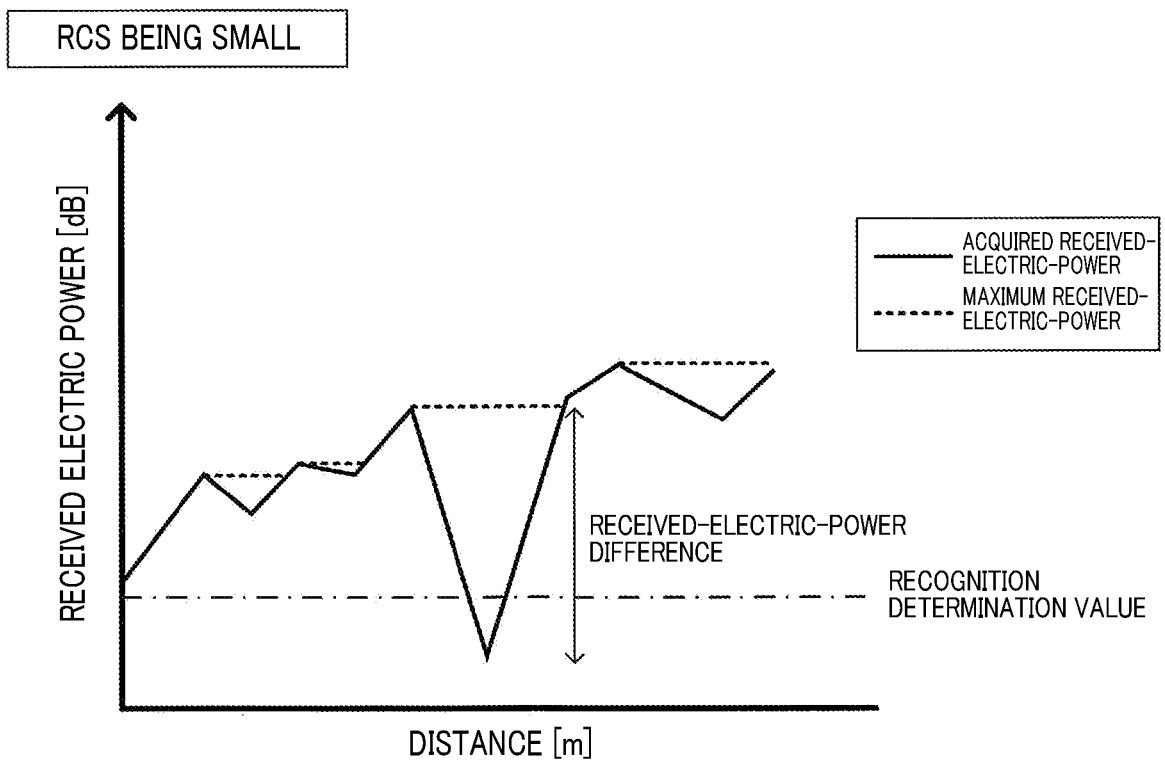

As shown in FIG. 7, in the case of the RCS of a moving object detected by the radar apparatus 2 being large, the acquired received-electric-power is higher than the recognition determination value even when the received-electric-power difference is greater than the drop determination value. Therefore, in this case, the tracking filter coefficients $\alpha$ and $\beta$ are set in step S110. In addition, RCS is an abbreviation of Radar Cross Section. On the other hand, in the case of the RCS of a moving object detected by the radar apparatus 2 being small, the acquired received-electric-power is lower than or equal to the recognition determination value when the received-electric-power difference is greater than the drop determination value. Therefore, in this case, the tracking filter coefficients $\alpha$ and $\beta$ are set in step S100.

Moreover, as shown in FIG. 3, if the vehicle VH is determined in step S70 to be neither traveling straight nor traveling through a gentle curve, the CPU 11 sets, in step S120, the tracking filter coefficients $\alpha$ and $\beta$ to be described later. Specifically, the CPU 11 sets the tracking filter coefficient $\alpha$ by referring to a first map for use when the vehicle VH is traveling through a curve. Moreover, the CPU 11 sets the tracking filter coefficient $\beta$ by referring to a second map for use when the vehicle VH is traveling through a curve. Thereafter, the CPU 11 advances the rear-approach warning process to step S180.

The first and second maps for use when the vehicle VH is traveling through a curve are set to have a positive correlation between the distance indicated by the observed-point information acquired in step S10 and the tracking filter coefficients $\alpha$ and $\beta$. Moreover, when compared at the same distance, the tracking filter coefficient $\alpha$ set by the first map for use when the vehicle VH is traveling through a curve is greater than the tracking filter coefficient $\alpha$ set by the first map for use when the received-electric-power is normal. Similarly, when compared at the same distance, the tracking filter coefficient $\beta$ set by the second map for use when the vehicle VH is traveling through a curve is greater than the tracking filter coefficient $\beta$ set by the second map for use when the received-electric-power is normal.

Figure 4:
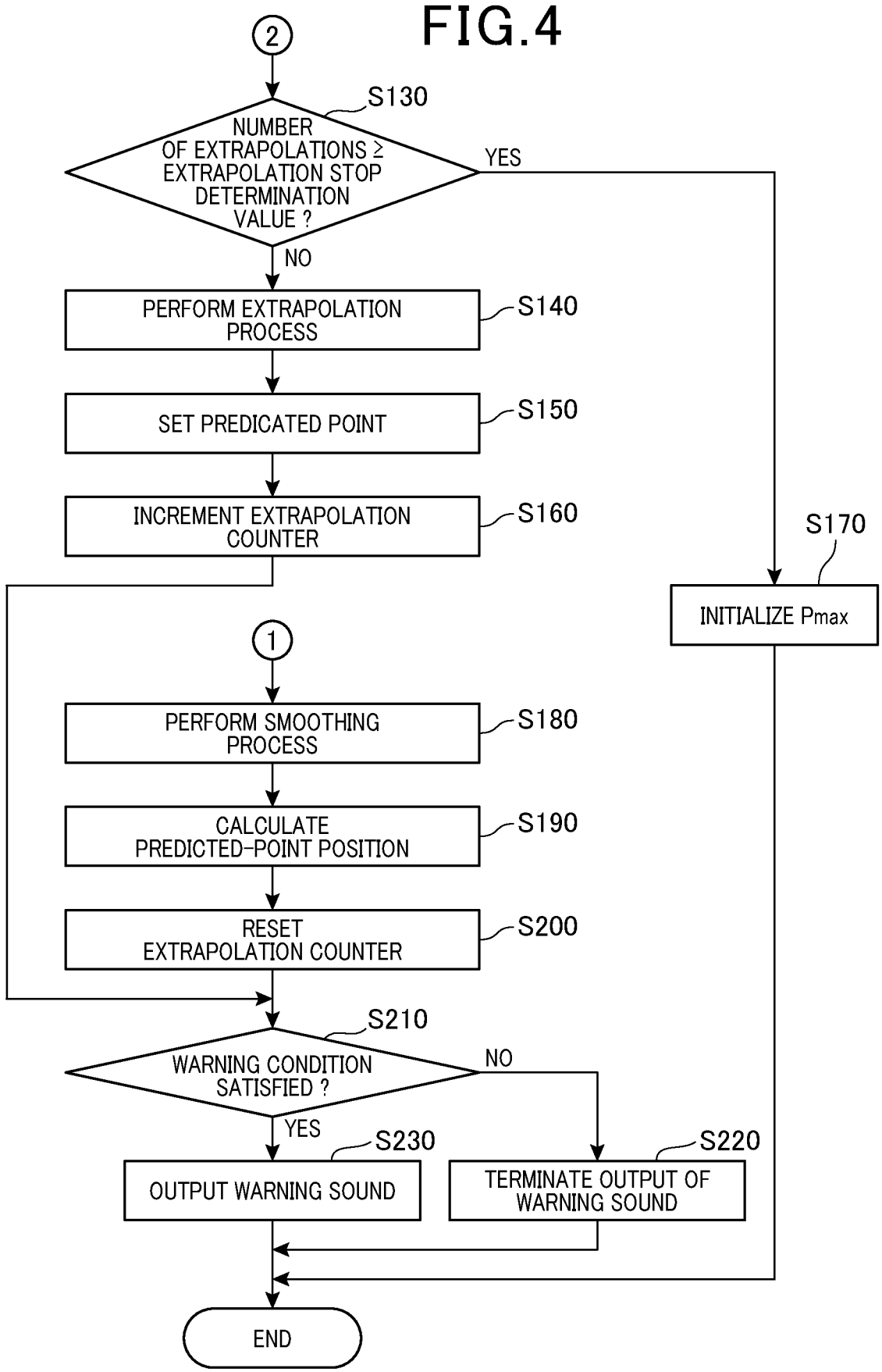
FIG. 4 is a flow chart illustrating a second half section of the rear-approach warning process.

As shown in FIG. 4, in step S180, the CPU 11 performs a smoothing process. In the present embodiment, the CPU 11 performs a well-known $\alpha$-$\beta$ filter process as the smoothing process. Specifically, the CPU 11 calculates the smoothed position Xs(k) and the smoothed velocity Vs(k) by the following Equations (1) and (2). The detection timing indicator k represents integers greater than or equal to 0, which respectively indicate detection timings of a plurality of observed points corresponding to the same object detected by the radar apparatus 2. That is, the detection timing indicator k of the observed point, which is detected earliest among the plurality of observed points corresponding to the same object, is 0. The earlier the detection timings of the observed points, the smaller values of the detection timing indicator k are assigned to the observed points.

Hereinafter, Xs(k) will be referred to as the kth smoothed position and Vs(k) will be referred to as the kth smoothed velocity.

$$Xs(k)=Xp(k)+\alpha\{Xm(k)-Xp(k)\} \quad (1)$$

$$Vs(k)=Vs(k-1)+(\beta/T)\{Xm(k)-Xp(k)\} \quad (2)$$

T in Equation (2) is the modulation period. Both α in Equation (1) and β in Equation (2) are the tracking filter coefficients. Xm(k) in both Equations (1) and (2) is the position of the kth observed point. Xm(k) is calculated based on the distance and azimuth indicated by the observed-point information acquired in step S10.

Xp(k) in both Equations (1) and (2) is the position of the kth predicted point. Xp(k) is calculated by the following Equation (3) in later-described step S190 in the rear-approach warning process performed before one modulation period.

Next, in step S190, the CPU 11 calculates the predicted-point position Xp(K+1) by the following Equation (3).

$$Xp(K+1)=Xs(k)+T\times Vs(k) \quad (3)$$

Further, in step S200, the CPU 11 resets (i.e., sets to 0) an extrapolation counter stored in the RAM 13. Thereafter, the CPU 11 advances the rear-approach warning process to step S210.

Moreover, if the current observed-point position is determined in step S40 to be outside the tracking region, then in step S130, the CPU 11 determines whether the value of the extrapolation counter (hereinafter, to be referred to as the number of extrapolations) is greater than or equal to a preset extrapolation stop determination value (e.g., 5 in the present embodiment). If the number of extrapolations is determined to be greater than or equal to the extrapolation stop determination value, then in step S170, the CPU 11 initializes (e.g., sets to 0 [dB]) the maximum received-electric-power Pmax. Thereafter, the CPU 11 terminates the rear-approach warning process.

On the other hand, if the number of extrapolations is determined to be less than the extrapolation stop determination value, then in step S140, the CPU 11 performs an extrapolation process. Specifically, the CPU 11 updates the latest smoothed position to a position that is obtained by moving the latest smoothed position at the latest smoothed velocity for one modulation period.

Further, in step S150, the CPU 11 sets the latest predicted-point position to a position that is obtained by moving the latest smoothed position, which has been updated in step S140, at the latest smoothed velocity for one modulation period. Then, the CPU 11 increments the extrapolation counter in step S160. Thereafter, the CPU 11 advances the rear-approach warning process to step S210.

In step S210, the CPU 11 determines whether a preset warning condition is satisfied. In the present embodiment, the warning condition is preset such that all of the following first, second and third conditions are satisfied. The first condition is that the smoothed position is on the rear side of the vehicle VH. The second condition is that the smoothed position is within a lane adjacent to and rightward of the lane on which the vehicle VH is traveling. The third condition is that a predicted time to collision TTC, which is calculated based on both the distance between the vehicle VH and the smoothed position and the smoothed velocity, is shorter than or equal to a preset warning determination time (e.g., 2 s in the present embodiment). In addition, TTC is an abbreviation of Time To Collision.

If the warning condition is not satisfied, then in step S220, the CPU 11 terminates the output of the warning sound from the warning device 3. Consequently, when the warning device 3 is outputting the warning sound, the output of the warning sound is interrupted; otherwise, when the warning device 3 is not outputting the warning sound, the state of the warning device 3 not outputting the warning sound is maintained. Thereafter, the CPU 11 terminates the rear-approach warning process.

On the other hand, if the warning condition is satisfied, then in step S230, the CPU 11 causes the warning device 3 to output the warning sound. Consequently, when the warning device 3 is outputting the warning sound, the state of the warning device 3 outputting the warning sound is maintained; otherwise, when the warning device 3 is not outputting the warning sound, the output of the warning sound is started. Thereafter, the CPU 11 terminates the rear-approach warning process.

The moving object detection apparatus 4 configured as described above repeatedly acquires, from the radar apparatus 2 that is mounted to the vehicle VH to transmit and receive radar waves, the observed-point information indicating, at least, the observed-point positions that are the positions of the observed points where the radar waves are reflected and the received electric powers that are the electric powers of the received radar waves.

The moving object detection apparatus 4 estimates, based on the observed-point positions indicated by a plurality of pieces of the observed-point information acquired respectively at different time instants, a tracking trajectory tracking the movement of a moving object corresponding to a plurality of the observed points.

The moving object detection apparatus 4 determines and stores, based on the received electric powers indicated by the plurality of pieces of the observed-point information acquired respectively at different time instants, the maximum received-electric-power Pmax that is a maximum value of the received electric powers.

The moving object detection apparatus 4 determines, for each of the plurality of pieces of the acquired observed-point information, whether the received-electric-power difference, which is the difference value obtained by subtracting the received electric power indicated by the piece of the acquired observed-point information from the stored maximum received-electric-power Pmax, is greater than the preset drop determination value.

The moving object detection apparatus 4 also determines, for each of the plurality of pieces of the acquired observed-point information, whether the received electric power indicated by the piece of the acquired observed-point information is lower than or equal to the preset recognition determination value.

When the received-electric-power difference is determined to be greater than the drop determination value and the received electric power is determined to be lower than or equal to the recognition determination value, the moving object detection apparatus 4 suppresses the degree of tracking the observed points in the estimated tracking trajectory.

As above, when the received-electric-power difference is determined to be greater than the drop determination value and the received electric power is determined to be lower than or equal to the recognition determination value, the moving object detection apparatus 4 determines that the S/N ratio is lowered. Moreover, when the S/N ratio is determined to be lowered, the moving object detection apparatus 4 suppresses the degree of tracking the observed points in the estimated tracking trajectory. The accuracy of detecting the positions of the observed points when the S/N ratio is lowered is low; therefore, it is possible for the moving object detection apparatus 4 to estimate the tracking trajectory of the moving object suppressing the influence of the observed points where the position detection accuracy is low. Consequently, the accuracy of detecting the position of the moving object can be improved.

In addition, the moving object detection apparatus 4 estimates the tracking trajectory on the basis of the observed-point positions indicated respectively by the plurality of pieces of the observed-point information and the tracking filter coefficients $\alpha$ and $\beta$ indicating the degree of tracking the observed-point positions. Moreover, the moving object detection apparatus 4 suppresses the degree of tracking in the tracking trajectory by setting the tracking filter coefficients $\alpha$ and $\beta$ so as to lower the degree of tracking. Consequently, it becomes possible for the moving object detection apparatus 4 to suppress the degree of tracking in the tracking trajectory by the simple method of setting the tracking filter coefficients $\alpha$ and $\beta$.

Figure 8:
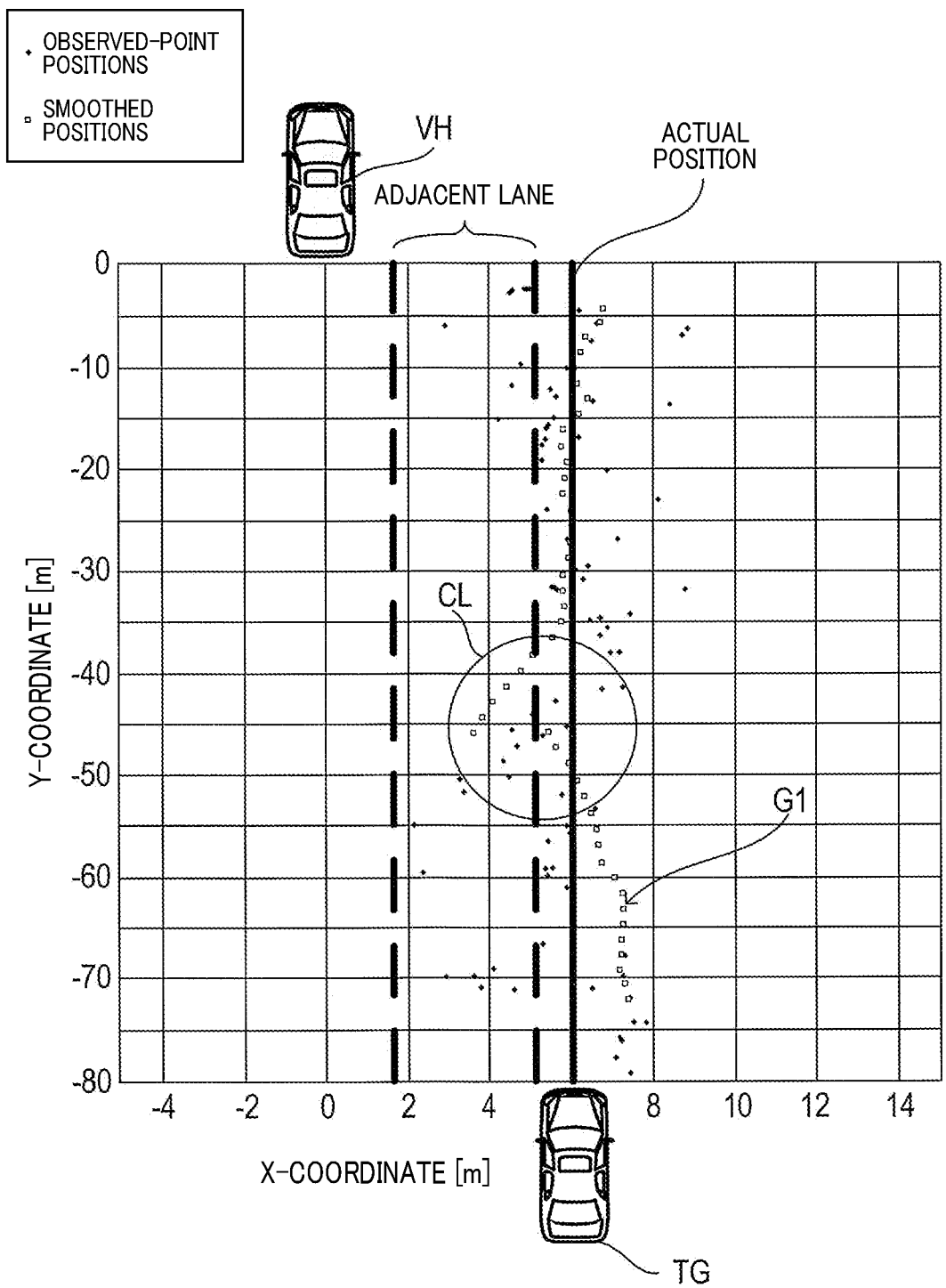
FIG. 8 is a diagram illustrating distortion of the trajectory of smoothed positions.

FIG. 8 shows the distribution of the observed-point positions and the smoothed positions in the case of detecting a moving object TG, which is approaching the vehicle VH from the right-rear side of the vehicle VH, with a moving object detection apparatus that does not use the method of setting the tracking filter coefficients according to the present disclosure. The point group G1 in FIG. 8 represents the trajectory of the smoothed positions (i.e., the tracking trajectory). The moving object TG is traveling on a lane on the right side of an adjacent lane; the adjacent lane is adjacent to and rightward of the lane on which the vehicle VH is traveling.

As shown in FIG. 8, in the region enclosed by a circle CL, due to the S/N ratio being lowered by multipath propagation via the road surface and the like, the azimuth detection accuracy by the radar apparatus 2 is lowered so that the smoothed positions of the moving object TG are located in the adjacent lane. That is, though the moving object TG is actually traveling straight, the moving object detection apparatus 4 determines that the moving object TG has made a lane change to the adjacent lane.

Figure 9:
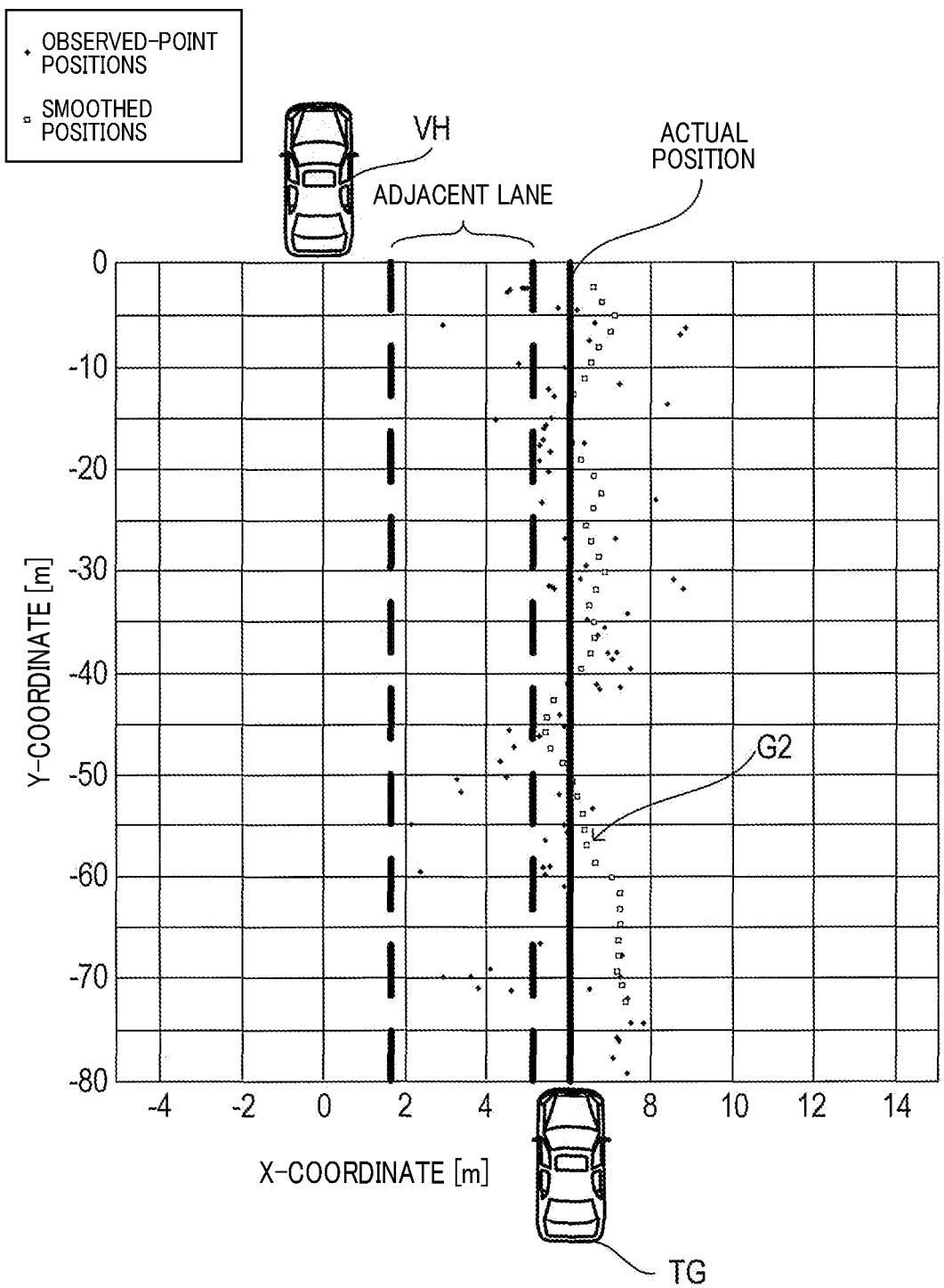
FIG. 9 is a diagram illustrating elimination of the distortion of the trajectory of smoothed positions.

In contrast, FIG. 9 shows the distribution of the observed-point positions and the smoothed positions in the case of detecting a moving object TG, which is approaching the vehicle VH from the right-rear side of the vehicle VH, with the moving object detection apparatus 4 according to the present disclosure. The point group G2 in FIG. 9 represents the trajectory of the smoothed positions (i.e., the tracking trajectory). The moving object TG is traveling on a lane on the right side of an adjacent lane; the adjacent lane is adjacent to and rightward of the lane on which the vehicle VH is traveling.

As shown in FIG. 9, the smoothed positions of the moving object TG are not located in the adjacent lane. Therefore, the moving object detection apparatus 4 determines that the moving object TG is traveling on the lane on the right side of the adjacent lane that is adjacent to and rightward of the lane on which the vehicle VH is traveling.

The moving object detection apparatus 4 sets the recognition determination value so as to have a negative correlation between the distance from the moving object to the vehicle VH and the recognition determination value. Moreover, the moving object detection apparatus 4 sets the drop determination value so as to have a negative correlation between the distance from the moving object to the vehicle VH and the drop determination value. Consequently, it becomes possible for the moving object detection apparatus 4 to set the recognition determination value and the drop determination value to suitable values according to the drop in the received electric powers due to increase in the distance from the moving object to the vehicle VH.

The moving object detection apparatus 4 determines whether a preset suppression execution condition, which indicates that the vehicle is traveling straight or through a gentle curve, is satisfied. In the present embodiment, the suppression execution condition is that the steering angle is within a preset traveling-straight determination range. Moreover, when it is determined that the suppression execution condition is not satisfied, the moving object detection apparatus 4 inhibits suppression of the degree of tracking in the tracking trajectory. Consequently, when a rapid position change is caused, by traveling of the vehicle through a tight curve, to occur in the width direction Dw of the vehicle VH in the results of detecting the position of the moving object by the radar apparatus 2, the moving object detection apparatus 4 can suppress deterioration of the responsiveness to the actual positions of the moving object in the tracking trajectory of the moving object.

Moreover, when it is determined that the suppression execution condition is not satisfied, the moving object detection apparatus 4 sets the tracking filter coefficients $\alpha$ and $\beta$ so as to make the degree of tracking become higher than when it is determined that the suppression execution condition is satisfied, thereby enhancing the degree of tracking the observed points in the estimated tracking trajectory. Consequently, when a rapid position change is caused, by traveling of the vehicle through a tight curve, to occur in the width direction Dw of the vehicle VH in the results of detecting the position of the moving object by the radar apparatus 2, the moving object detection apparatus 4 can improve the responsiveness to the actual positions of the moving object in the tracking trajectory of the moving object.

In the above-described embodiment, step S10 corresponds to a process performed by an information acquisition unit; step S180 corresponds to a process performed by a trajectory estimation unit; and steps S50 and S60 correspond to a process performed by a maximum electric power storage unit.

Moreover, step S80 corresponds to a process performed by an electric-power drop determination unit; step S90 corresponds to a process performed by a recognition determination unit; and step S100 corresponds to a process performed by a suppression unit.

Furthermore, step S70 corresponds to processes performed by a suppression determination unit and an inhibition unit; and step S120 corresponds to a process performed by an enhancing unit.

As above, one embodiment of the present disclosure has been described. However, the present disclosure is not limited to the above-described embodiment and can be carried out through various modifications.

For example, in the above-described embodiment, the radar apparatus 2 uses the FMCW method. However, the radar method of the radar apparatus 2 is not limited to the FMCW method. For example, the radar apparatus 2 may alternatively use a two-frequency CW method or an FCM method. In addition, FCM is an abbreviation of Fast-Chirp Modulation.

In the above-described embodiment, the radar apparatus 2 is configured to transmit radar waves to the right-rear side of the vehicle VH. However, the transmission direction of radar waves is not limited to the direction toward the right-rear side of the vehicle VH. For example, the radar apparatus 2 may alternatively be configured to transmit radar waves to at least one of a front side, a right-front side, a left-front side, a rear side, the right-rear side, a left-rear side, a right side and a left side of the vehicle VH.

In the above-described embodiment, when the steering angle is within the preset traveling-straight determination range, the moving object detection apparatus 4 determines that the vehicle VH is traveling straight or through a gentle curve. However, the determination as to whether or not the vehicle VH is traveling straight or through a gentle curve is not limited to the above method. For example, the determination may alternatively be made based on the yaw rate of the vehicle VH and the traveling speed of the vehicle VH.

Moreover, a function realized by a single component in the above-described embodiment may alternatively be realized by a plurality of components together. In contrast, functions realized by a plurality of components in the above-described embodiment may alternatively be realized by a single component. Furthermore, part of the configuration of the above-described embodiment may be omitted. In addition, the configuration of the above-described embodiment may be partially added to or partially replaced with the configuration of any other embodiment.

In addition to the above-described moving object detection apparatus 4, the present disclosure may also be embodied in various modes such as a system that includes the moving object detection apparatus 4 as a component thereof, a program for enabling a computer to function as the moving object detection apparatus 4, a storage medium having the program stored therein, and a method of detecting a moving object.

What is claimed is:

1. A moving object detection apparatus comprising:
a processor;
a non-transitory computer-readable storage medium; and
a set of computer-executable instructions stored on the non-transitory computer-readable storage medium that cause the processor to:
repeatedly acquire, from a radar apparatus that is mounted to a vehicle to transmit and receive radar waves, observed-point position information indicating observed-point positions that are positions of observed points where the radar waves are reflected;
estimate, based on the observed-point positions indicated by a plurality of pieces of the observed-point position information acquired respectively at different time instants and tracking filter coefficients indicating a degree of tracking the observed-point positions, a tracking trajectory tracking movement of a moving object corresponding to a plurality of the observed points;
determine whether distribution of the plurality of the observed points on both sides of the tracking trajectory is continuously biased to one side of the tracking trajectory; and
set the tracking filter coefficients so that the degree of tracking is higher when the distribution of the plurality of the observed points is determined to be biased than when the distribution of the plurality of the observed points is determined to be not biased.

2. The moving object detection apparatus as set forth in claim 1, wherein the set of computer-executable instructions further cause the processor to
set the tracking filter coefficients so as to have a positive correlation between the size of bias of the observed-point positions with respect to the tracking trajectory and the tracking filter coefficients.

3. The moving object detection apparatus as set forth in claim 1, wherein the set of computer-executable instructions further cause the processor to:
determine whether the moving object is approaching the vehicle along an adjacent lane that is adjacent to the vehicle; and
inhibit, when the moving object is determined to be approaching the vehicle along the adjacent lane, the setting of the tracking filter coefficients.

4. The moving object detection apparatus as set forth in claim 1, wherein the set of computer-executable instructions further cause the processor to set the tracking filter coefficients so as to have a positive correlation between the distance from the moving object to the vehicle and the tracking filter coefficients.

5. The moving object detection apparatus as set forth in claim 1, wherein the set of computer-executable instructions further cause the processor to:
calculate, based on the estimated tracking trajectory, a predicted-point position predicting the observed-point position to be indicated by the observed-point position information to be acquired next;
set a bias determination region that has its center at the predicted-point position and a preset lateral length in a width direction of the vehicle; and
determine, when the positions of the plurality of the observed points are continuously located outside the bias determination region, that the distribution of the plurality of the observed points is biased.

6. The moving object detection apparatus as set forth in claim 5, wherein the set of computer-executable instructions further cause the processor to set the lateral length so as to have a positive correlation between the distance from the current position of the moving object to the predicted-point position and the lateral length.

7. A method for detecting a moving object comprising:
repeatedly acquire, from a radar apparatus that is mounted to a vehicle to transmit and receive radar waves, observed-point position information indicating observed-point positions that are positions of observed points where the radar waves are reflected;
estimate, based on the observed-point positions indicated by a plurality of pieces of the observed-point position information acquired respectively at different time instants and tracking filter coefficients indicating a degree of tracking the observed-point positions, a tracking trajectory tracking movement of a moving object corresponding to a plurality of the observed points;
determine whether distribution of the plurality of the observed points on both sides of the tracking trajectory is continuously biased to one side of the tracking trajectory; and
set the tracking filter coefficients so that the degree of tracking is higher when the distribution of the plurality of the observed points is determined to be biased than when the distribution of the plurality of the observed points is determined to be not biased.

8. A system for detecting a moving object comprising:
a radar apparatus that is mounted to a vehicle and configured to transmit and receive radar waves; and
a moving object detection apparatus comprising:
a processor;
a non-transitory computer-readable storage medium; and a set of computer-executable instructions stored on the non-transitory computer-readable storage medium that cause the processor to:

repeatedly acquire, from the radar apparatus, observed-point position information indicating observed-point positions that are positions of observed points where the radar waves are reflected;

estimate, based on the observed-point positions indicated by a plurality of pieces of the observed-point position information acquired respectively at different time instants and tracking filter coefficients indicating a degree of tracking the observed-point positions, a tracking trajectory tracking movement of a moving object corresponding to a plurality of the observed points;

determine whether distribution of the plurality of the observed points on both sides of the tracking trajectory is continuously biased to one side of the tracking trajectory; and set the tracking filter coefficients so that the degree of tracking is higher when the distribution of the plurality of the observed points is determined to be biased than when the distribution of the plurality of the observed points is determined to be not biased.

* * * * *